US011193216B2

(12) United States Patent
Cao et al.

(10) Patent No.: US 11,193,216 B2
(45) Date of Patent: Dec. 7, 2021

(54) METHODS AND SYSTEMS FOR ELECTROCHEMICAL MACHINING OF ARTICLES FORMED BY ADDITIVE MANUFACTURING

(71) Applicant: HONEYWELL INTERNATIONAL INC., Morris Plains, NJ (US)

(72) Inventors: Gangmin Cao, Shanghai (CN); Shangyou Yang, Shanghai (CN); Jingkang Lv, Shanghai (CN); Juan Dou, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 263 days.

(21) Appl. No.: 16/433,655

(22) Filed: Jun. 6, 2019

(65) Prior Publication Data
US 2020/0385883 A1    Dec. 10, 2020

(51) Int. Cl.
*C25F 3/22*        (2006.01)
*B33Y 40/00*       (2020.01)
*B33Y 80/00*       (2015.01)

(52) U.S. Cl.
CPC ............... *C25F 3/22* (2013.01); *B33Y 40/00* (2014.12); *B33Y 80/00* (2014.12)

(58) Field of Classification Search
CPC .......... C25F 3/22; B33Y 40/00; B33Y 80/00; B33Y 40/20; B22F 2999/00; B22F 10/62
See application file for complete search history.

(56) References Cited

U.S. PATENT DOCUMENTS

| 4,601,803 A | 7/1986 | Gregory |
| 4,645,581 A | 2/1987 | Voggenthaler et al. |
| 6,413,407 B1 | 7/2002 | Bruns et al. |
| 6,660,138 B2 | 12/2003 | Lin et al. |
| 6,712,668 B2 | 3/2004 | Lorincz |
| 8,535,491 B2 | 9/2013 | Wei et al. |

(Continued)

FOREIGN PATENT DOCUMENTS

| CN | 108546984 A | 9/2018 |
| DE | 10318064 A1 | 5/2004 |

(Continued)

OTHER PUBLICATIONS

Gomez-Gallegos, A.A. and Mill, F. and Mount, A.R. (2016) Surface finish control by electrochemical polishing in stainless steel 316 pipes. Journal of Manufacturing Processes, 23. pp. 83-89. ISSN 1526-6125 , http://dx.doi.org/10.1016/j-jmapro.2016.05.010.

*Primary Examiner* — Moshe Wilensky
(74) *Attorney, Agent, or Firm* — Lorenz & Kopf, LLP

(57) ABSTRACT

A method for electrochemical machining of a metallic article formed by additive manufacturing includes obtaining or producing the metallic article. The metallic article includes an interior surface and a geometry. The method further includes inserting a flexible, metallic cathode tube into the article. The metallic cathode is spaced apart from the interior surface of the article, and the metallic cathode tube is inserted so as to conform to the geometry of the article. Still further, the method includes introducing an electrolyte fluid into the metallic cathode tube and the interior surface of the article and electrochemical machining the metallic article by applying a voltage across the cathode tube and the metallic article, the metallic article functioning as an anode.

12 Claims, 4 Drawing Sheets

(56) References Cited

U.S. PATENT DOCUMENTS

| | | | |
|---|---|---|---|
| 9,981,331 B2 | 5/2018 | Tamura et al. | |
| 10,413,983 B2 * | 9/2019 | Lynch | C25F 3/16 |
| 2015/0184310 A1 | 7/2015 | Na et al. | |
| 2018/0272449 A1 | 9/2018 | Luo et al. | |

FOREIGN PATENT DOCUMENTS

| | | |
|---|---|---|
| DE | 102005034940 A1 | 1/2007 |
| JP | S62224522 A | 10/1987 |
| RU | 103361 U1 | 4/2011 |
| RU | 135649 U1 | 12/2013 |

* cited by examiner

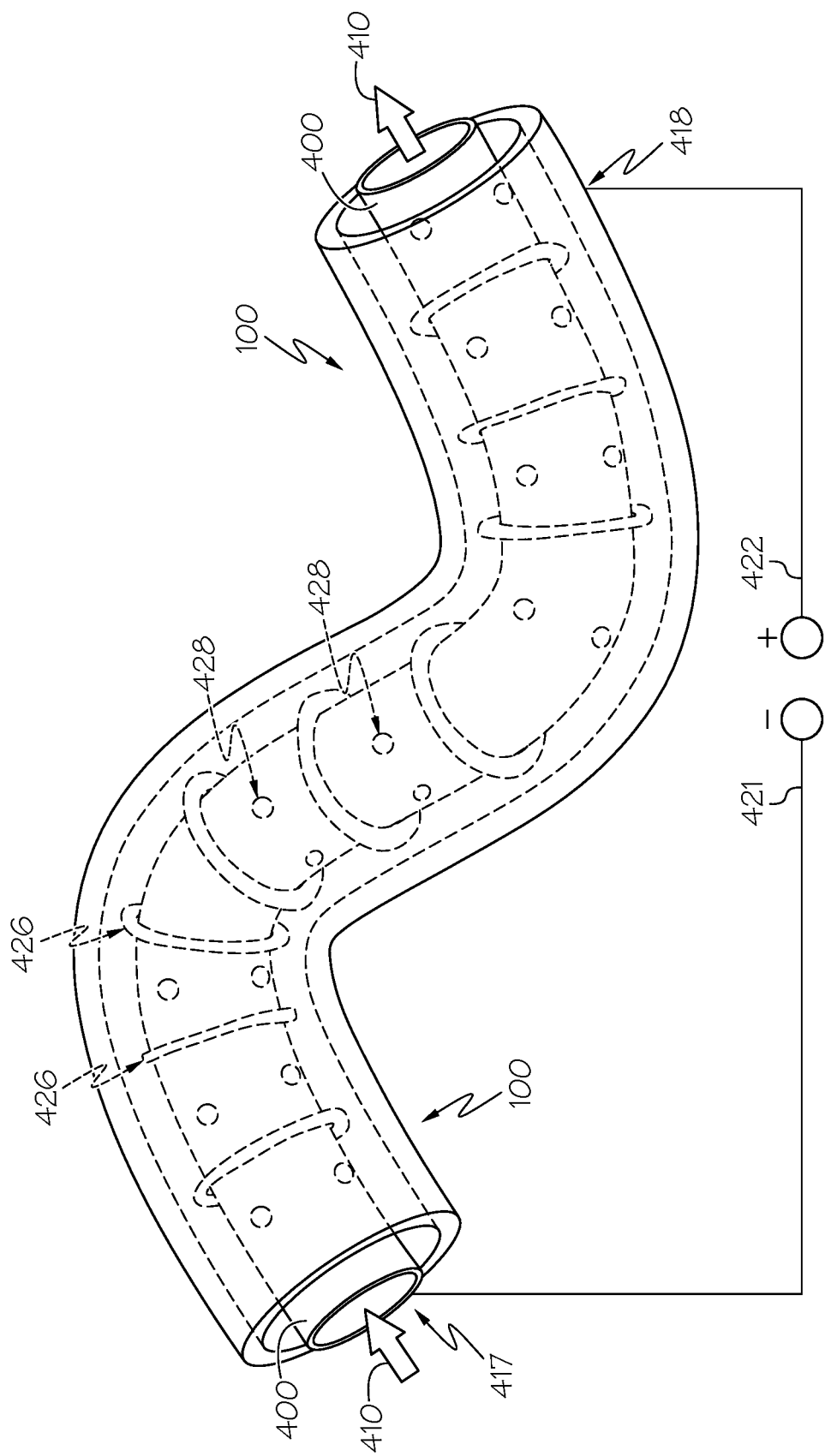

METHODS AND SYSTEMS FOR
ELECTROCHEMICAL MACHINING OF
ARTICLES FORMED BY ADDITIVE
MANUFACTURING

TECHNICAL FIELD

The present disclosure generally relates to methods and systems for manufacturing articles. More particularly, the present disclosure relates to methods and systems for electrochemical machining of articles formed by additive manufacturing.

BACKGROUND

Additive manufacturing (AM) is a manufacturing method that uses a three-dimensional model to directly fabricate an article layer by layer. One advantage of AM is the ability to realize complexity and design freedom, reduced weight, and rapid prototyping. In aerospace, automotive, and other industries, metal additive manufacturing, such as powder bed fusion (PBF) processes, are deployed on a wide basis. However, the limitation of as-built surface roughness becomes a common problem for metal AM parts using PBF. The as-built surface roughness of metal AM parts is about 300-500 micro-inches in many cases, and even worse on internal surfaces. In contrast, typical design requirements for maximum surface roughness may be less than about 125 micro-inches. Although post-processing (sand blasting, machining, etc.) can improve the surface roughness, it is time consuming and does not work well for the internal surfaces.

Electrochemical machining (ECM) has been used as a technology to improve roughness of internal and external surfaces of AM parts. However, ECM has proven difficult in the context of the internal surfaces of additively manufactured articles that have bends in their structure, such as pipes, due to the requirement that the cathode be inserted throughout the article in order to ensure sufficient action of the ECM process (polishing). For this reason, ECM on an industrial scale has heretofore been restricted to use in articles with a relatively open, straight geometry.

Hence, there is a need for improved post-build methods to improve the surface roughness of AM-built articles, particularly of internal surfaces. In particular, it would be desirable to extend the use of ECM to articles with curved or otherwise restricted geometries. Furthermore, other desirable features and characteristics of the present disclosure will become apparent from the subsequent detailed description and the appended claims, taken in conjunction with the accompanying drawings and the preceding background.

BRIEF SUMMARY

In accordance with one exemplary embodiment, a method for electrochemical machining of a metallic article formed by additive manufacturing includes obtaining or producing the metallic article. The metallic article includes an interior surface and a geometry. The method further includes inserting a flexible, metallic cathode tube into the article. The metallic cathode is spaced apart from the interior surface of the article, and the metallic cathode tube is inserted so as to conform to the geometry of the article. Still further, the method includes introducing an electrolyte fluid into the metallic cathode tube and the interior surface of the article and electrochemical machining the metallic article by applying a voltage across the cathode tube and the metallic article, the metallic article functioning as an anode.

In accordance with another exemplary embodiment, a system for electrochemical machining of a metallic article formed by additive manufacturing includes the metallic article, wherein the metallic article includes an interior surface and a geometry, and a flexible, metallic cathode tube inserted into the article, wherein the metallic cathode is spaced apart from the interior surface of the article, and wherein the metallic cathode tube is inserted so as to conform to the geometry of the article. The system further includes an electrolyte fluid introduced into the metallic cathode tube and the interior surface of the article, and a cathode terminal at the cathode tube and an anode terminal at the metallic article, wherein the cathode and anode terminals are configured for applying a voltage across the cathode tube and the metallic article, thereby electrochemical machining the metallic article.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIG. 5 diagrammatically illustrates an exemplary electrochemical machining process for the pipe of FIG. 1 in accordance with some embodiments of the present disclosure.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In order to overcome the aforementioned challenges of ECM in the context of interior surfaces of AM-built articles that have bends or other confined geometries, such as pipes, the embodiments of the present disclosure utilize a flexible ECM cathode in the form of a metallic tube that is inserted throughout the articles, and whose shape is able to conform to the interior of the article. In this manner, the cathode is brought sufficiently-close to all of the interior surface of the article to effect complete ECM polishing in an efficient manner Using a flexible cathode, bends, curves, and other difficult interior geometries may be adequately polished to achieve the desired reduction in surface roughness.

Figure 1:
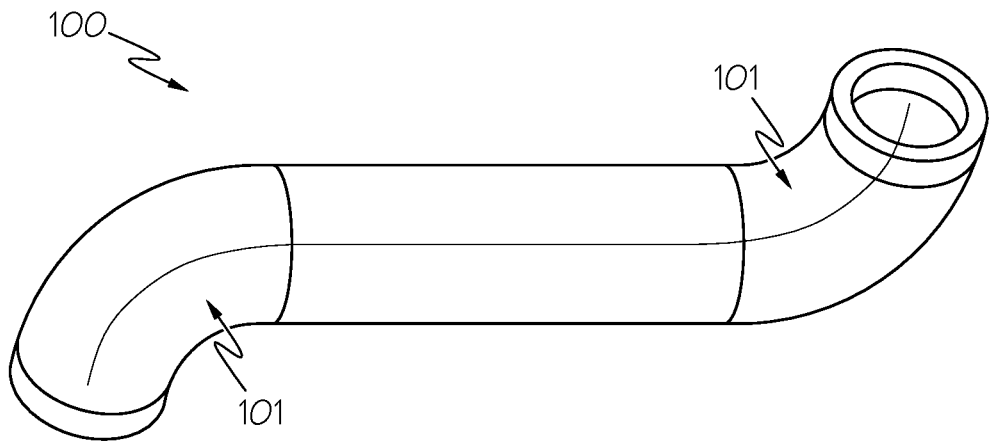
FIG. 1 illustrates an exemplary additively-manufactured pipe that may be subjected to the electrochemical machining methods of the present disclosure.

Referring now to FIG. 1, illustrated is an exemplary metallic pipe 100 that includes one or more bends 101. Although the described embodiments are suitable for use with pipes such as metallic pipe 100, it should be appreciated that other articles of manufacture having an interior surface and possibly one or more non-linearities would be suitable for use as well. Pipes such as metallic pipe 100 find wide use in aerospace, automotive, and other industrial applications. Due to their wide use, it is desirable to be able to rapidly-prototype such articles for testing, and thus their fabrication using additive manufacturing methods such as PBF is common. However, as initially noted, pipe 100 as-built is likely to contain significant surface roughness, especially on its interior surfaces, which would render it non-satisfactory for testing or actual use purposes.

Figure 2:
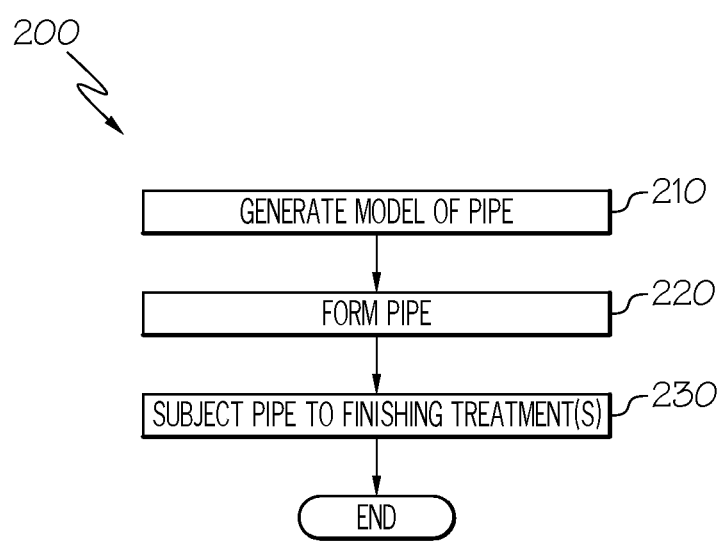
FIG. 2 is a flow diagram illustrating steps in a method of forming a metallic pipe such as in FIG. 1 using additive manufacturing techniques in accordance with some embodiments the present disclosure.

For example, the metallic pipe 100 of FIG. 1, or any other metallic article, may be manufactured initially in accordance with the additive manufacturing techniques described in connection with FIGS. 2 and 3. FIG. 2 is a flowchart illustrating a method 200 for manufacturing an article/component, for example the pipe 100, using any known additive manufacturing techniques. In a first step 210, a model, such as a design model, of the component may be defined in any suitable manner. For example, the model may be designed with computer aided design (CAD) software and may include three-dimensional ("3D") numeric coordinates of the entire configuration of the component including both external and internal surfaces. In one exemplary embodiment, the model may include a number of successive two-dimensional ("2D") cross-sectional slices that together form the 3D component. Of course, it is not necessary that a "near-net" component be formed using this process. Rather, it may simply be desired to produce a "block" of the alloy using additive manufacturing. Accordingly, the present disclosure should not be considered as limited by any particular article/component design.

In step 220 of the method 200, the component is formed according to the model of step 210. In one exemplary embodiment, a portion of the component is formed using a rapid prototyping or additive layer manufacturing process. In other embodiments, the entire component is formed using a rapid prototyping or additive layer manufacturing process. Although additive layer manufacturing processes are described in greater detail below, in still other alternative embodiments, portions of the component may be forged or cast in step 220.

Some examples of PBF additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. In general, additive manufacturing techniques provide flexibility in free-form fabrication without geometric constraints, fast material processing time, and innovative joining techniques. In one particular exemplary embodiment, direct metal laser fusion (DMLF) is used to produce the article/component in step 220, such as blade 100. DMLF is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 220 is performed with DMLF techniques to form the component. However, prior to a discussion of the subsequent method steps, reference is made to FIG. 3, which is a schematic view of a DMLF system 300 for manufacturing the component, for example one or more gas turbine engine components, in accordance with an exemplary embodiment.

Figure 3:
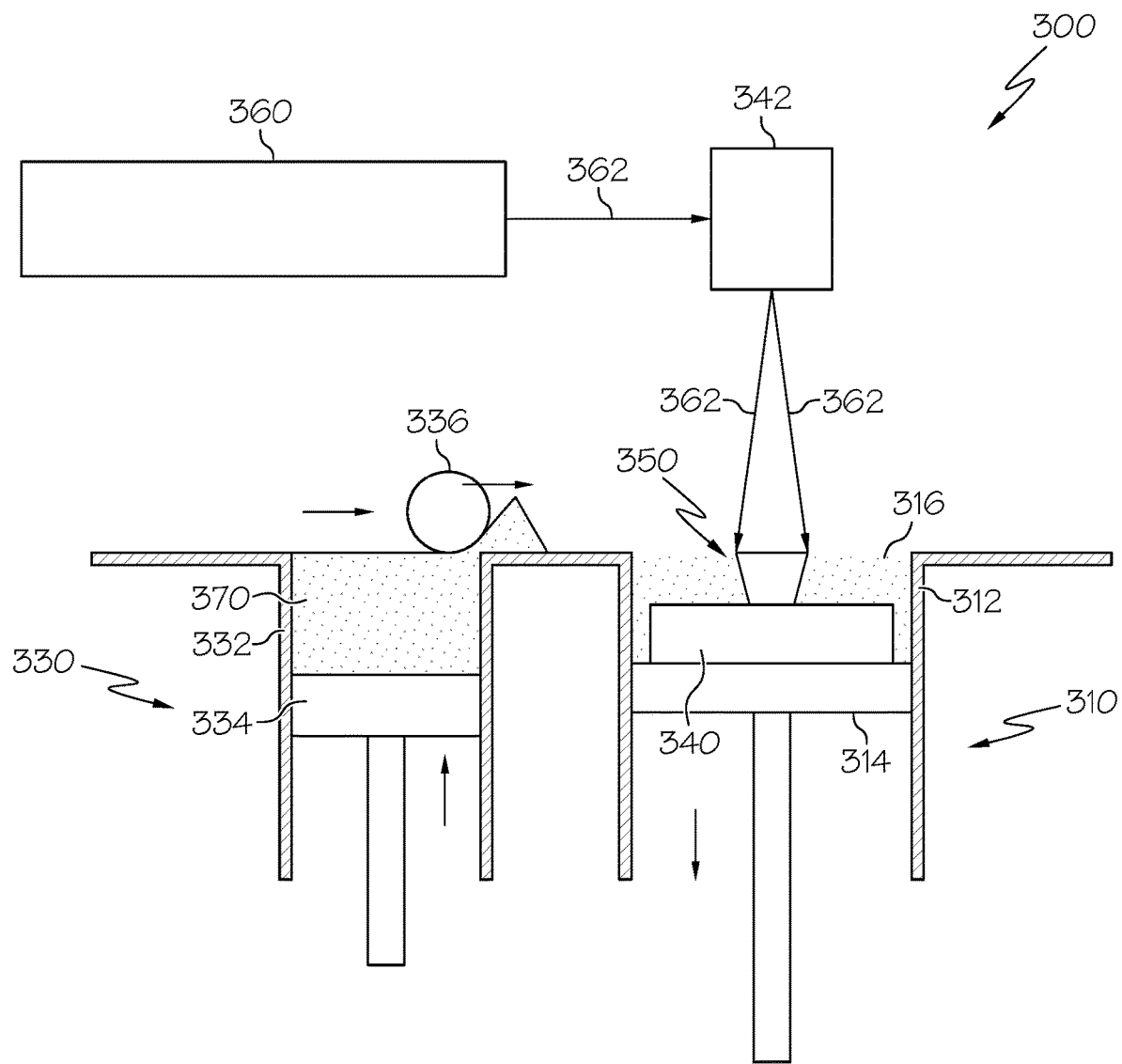
FIG. 3 is an exemplary additive manufacturing system suitable for use in forming a metallic pipe in accordance with some embodiments of the present disclosure.

Referring to FIG. 3, the system 300 includes a fabrication device 310, a powder delivery device 330, a scanner 342, and a low energy density energy beam generator, such as a laser 360 (or an electron beam generator) that functions to manufacture the article 350 (e.g., the pipe) with build material 370. The fabrication device 310 includes a build container 312 with a fabrication support 314 on which the article 350 is formed and supported. The fabrication support 314 is movable within the build container 312 in a vertical direction and is adjusted in such a way to define a working plane 316. The delivery device 330 includes a powder chamber 332 with a delivery support 334 that supports the build material 370 and is also movable in the vertical direction. The delivery device 330 further includes a roller or wiper 336 that transfers build material 370 from the delivery device 330 to the fabrication device 310.

During operation, a build plate 340 may be installed on the fabrication support 314. The fabrication support 314 is lowered and the delivery support 334 is raised. The roller or wiper 336 scrapes or otherwise pushes a portion of the build material 370 from the delivery device 330 to form the working plane 316 in the fabrication device 310. The laser 360 emits a laser beam 362, which is directed by the scanner 342 onto the build material 370 in the working plane 316 to selectively fuse the build material 370 into a cross-sectional layer of the article 350 according to the design. More specifically, the speed, position, and other operating parameters of the laser beam 362 are controlled to selectively fuse the powder of the build material 370 into larger structures by rapidly melting the powder particles that may melt or diffuse into the solid structure below, and subsequently, cool and re-solidify. As such, based on the control of the laser beam 362, each layer of build material 370 may include unfused and fused build material 370 that respectively corresponds to the cross-sectional passages and walls that form the article 350. In general, the laser beam 362 is relatively low power to selectively fuse the individual layer of build material 370. As an example, the laser beam 362 may have a power of approximately 50 to 500 Watts, although any suitable power may be provided.

Upon completion of a respective layer, the fabrication support 314 is lowered and the delivery support 334 is raised. Typically, the fabrication support 314, and thus the article 350, does not move in a horizontal plane during this step. The roller or wiper 336 again pushes a portion of the build material 370 from the delivery device 330 to form an additional layer of build material 370 on the working plane 316 of the fabrication device 310. The laser beam 362 is movably supported relative to the article 350 and is again controlled to selectively form another cross-sectional layer. As such, the article 350 is positioned in a bed of build material 370 as the successive layers are formed such that the unfused and fused material supports subsequent layers.

This process is continued according to the modeled design as successive cross-sectional layers are formed into the completed desired portion, e.g., the component of step 220.

The delivery of build material 370 and movement of the article 350 in the vertical direction are relatively constant and only the movement of the laser beam 362 is selectively controlled to provide a simpler and more precise implementation. The localized fusing of the build material 370 enables more precise placement of fused material to reduce or eliminate the occurrence of over-deposition of material and excessive energy or heat, which may otherwise result in cracking or distortion. The unused and unfused build material 370 may be reused, thereby further reducing scrap.

Any suitable laser and laser parameters may be used, including considerations with respect to power, laser beam spot size, and scanning velocity. The build material 370 may be provided as a metallic superalloy. For use in gas turbine engines, nickel-based superalloys are commonly used. One example of a suitable nickel-based superalloy for use with the methods of the present disclosure is the alloy Mar-M-247, the elemental constituents of which are well-known in the art.

Returning to FIG. 2, at step 230, the component formed in step 220 may undergo finishing treatments. The finishing treatments include the ECM process as will be described below in connection with FIGS. 4 and 5. Optionally, further finishing treatments may include, for example, the application of coatings. If necessary, the component may be machined to final specifications.

Electrochemical machining is a machining process that removes material from an article to reduce surface roughness. This machining uses an electrochemical process to remove material and change the article with regard to its surfaces. Electrochemical machining uses both an electrolyte solution and an electrical current to alter the workpiece. Because electrical conductivity is necessary for electrochemical machining, the articles material must be conductive, and hence the AM-built article is made of a metal. Electrochemical machining is the opposite process to electrochemical or galvanic coating. In electrochemical machining, the article (such as pipe 100) is taken as the anode, and the cathode in the context of the present disclosure is a flexible metallic tube, such as the flexible metallic tube 400 shown in FIG. 4. Flexible tube 400 may be of any length or shape (selected for its intended use), and it should be sufficiently flexible to accommodate any bend in an article. The article and the cathode tube are both placed in an electrolyte solution, wherein the cathode tube is inserted within the interior of the article, and an electrical current is passed through the solution between them. The article and cathode tube are placed very close to each other but are not touching, such as several millimeters distance.

As the electrical current is applied, the material removal from the article happens at the atomic level, producing a finish with reduced surface roughness, such as less than about 125 micro-inches. In particular, the electrochemical reactions take place at the anode (article) and the cathode (tube), as well as the surrounding electrolyte fluid. As the electrical current is applied across the electrode, ions move between the tube and the article. In electrochemical machining, positive ions move towards the tube, and negative ions move towards the article. As electrons cross the gap between the article and the tube, metal ions come away from the article. These ions combine with hydroxyl ions to form metal hydroxides which are carried away by the electrolyte solution. The result is a finished article with the desired material removed to create the desired reduction in surface roughness from the initial as-build AM condition.

Figure 4:
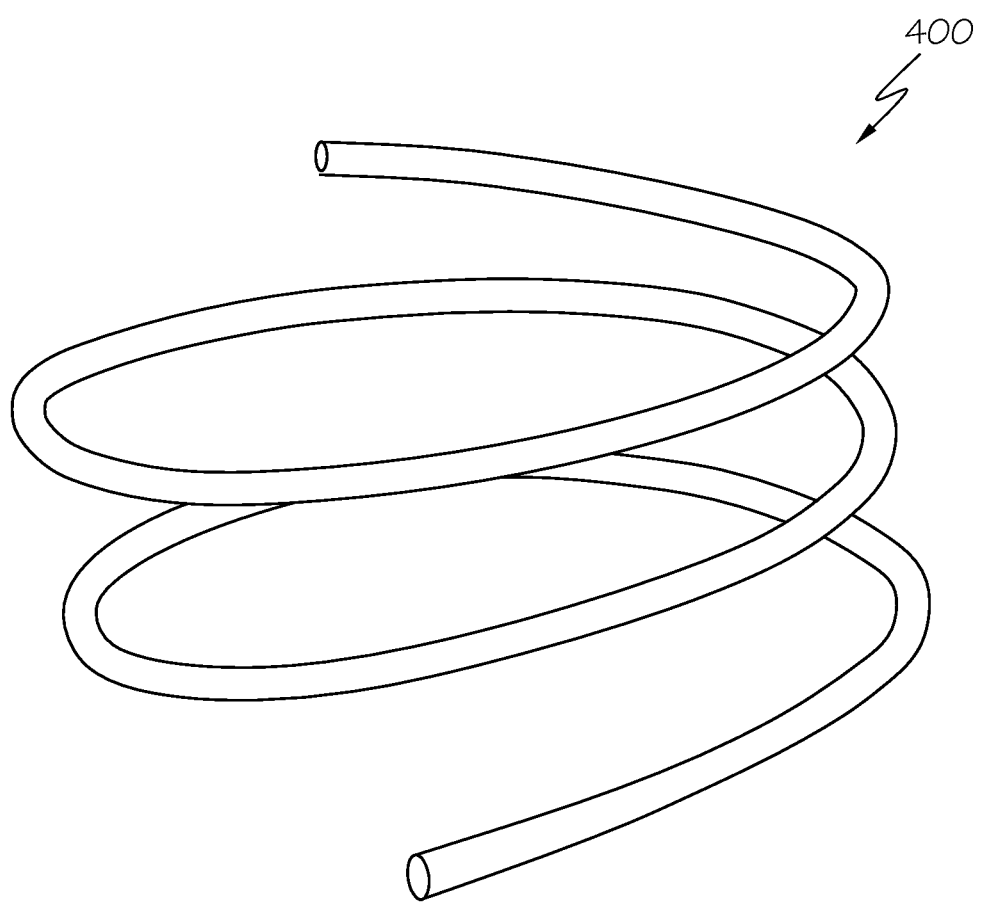
FIG. 4 illustrates an exemplary flexible, conductive tube that may be used as a cathode for the electrochemical machining methods of the present disclosure.

In accordance with the foregoing, reference is now made to FIG. 5, which illustrates an exemplary ECM process in accordance with the present disclosure. As can be seen, the flexible cathode tube 400 shown in FIG. 4 is inserted into the metallic pipe 100 shown in FIG. 1. These two items themselves are submerged in an electrolyte solution (not illustrated for clarity). A cathode terminal 417 is connected with the cathode tube 400 and negative voltage 421, and an anode terminal 418 is connected to the article (pipe) 100 and positive voltage 422. A pump may be employed to circulate the electrolyte solution through the cathode tube 400 and through the pipe 100 as indicted by arrows 410 in FIG. 5. As shown in FIG. 5, the cathode tube 400 is flexible and bends to conform to the shape of the interior of the pipe 100 so that a close distance between the cathode and the article can be maintained throughout the interior of the pipe 100 to achieve effective and efficient ECM. The length of time required to complete the ECM process, once voltage is applied and the electrolyte is circulated, depends on the size of the article and the particular metal used, but in general may be anywhere from about 10 minutes to about several hours.

In some embodiments, the cathode tube 400 may be fitted with a plurality of annular, non-conductive spacers 426, as illustrated in FIG. 5. The non-conductive spacers 426 serve to ensure that the metallic cathode tube 400 never makes contact with the interior surface of the pipe 100. The non-conductive spacers 426 also serve to maintain a consistent distance of separation between the flexible cathode tube 400 and the interior surface of the pipe 100 so that a consistent amount of material removal occurs at all areas of the interior surface. The spacers 426 may have gaps or other shape irregularities in them so that circulation of the electrolyte is able to be maintained. Any number of spacers 426 may be used, and they may be positioned along the tube 400 as required for a given implementation. Furthermore, in some embodiments, the cathode tube 400 may be provided with a plurality of holes 428, as shown in FIG. 5. The holes 428 allow the electrolyte solution to flow therethrough under the pressure supplied by the pump, which causes agitation in the electrolyte solution within the interior of the pipe 100 near the interior surface. In effect, the holes allow for a "jet" of electrolyte solution to be directed at the interior surface of the pipe 100. This agitation results in a more efficient and even removal of material.

Thus, using the action of the pump and the holes 428, electrolyte solution is moved through the interior of the pipe 100 while current is applied to effect ECM of the interior surfaces of the pipe 100. As the electrolyte solution is pumped and agitated within the pipe 100, it makes contact with the interior surfaces of the pipe 100 to gradually effect the removal of some metallic material. As rough surfaces that extend outward will geometrically make more contact with the electrolyte solution than other portions of the interior surface, the rough surfaces will be removed more quickly, thus causing a reduction in surface roughness. The electrolyte solution then carries away any removed material as it is pumped out of the pipe 100, as indicated by arrows 410.

Accordingly, the present disclosure has provided methods to overcome the aforementioned challenges of ECM in the context of interior surfaces of AM-built articles that have bends or other confined geometries, such as pipes. The embodiments of the present disclosure utilize a flexible ECM cathode in the form of a metallic tube that is inserted throughout the articles, and whose shape is able to conform to the interior of the article. In this manner, the cathode is brought sufficiently-close to all of the interior surface of the article to effect complete ECM polishing in an efficient manner. Using a flexible cathode, bends, curves, and other difficult interior geometries may be adequately polished to achieve the desired reduction in surface roughness.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for electrochemical machining of a metallic article formed by additive manufacturing, comprising:
    obtaining or producing the metallic article, wherein the metallic article comprises an interior surface and a geometry;
    inserting a flexible, metallic cathode tube into the article, wherein the metallic cathode is spaced apart from the interior surface of the article, wherein the metallic cathode tube comprises a plurality of holes, and wherein the metallic cathode tube is inserted so as to conform to the geometry of the article;
    introducing an electrolyte fluid into the metallic cathode tube and the interior surface of the article; and
    electrochemical machining the metallic article by applying a voltage across the cathode tube and the metallic article, the metallic article functioning as an anode.

2. The method of claim 1, wherein the geometry is non-linear and comprises one or more bends.

3. The method of claim 2, wherein the metallic article comprises a pipe.

4. The method of claim 1, wherein the metallic cathode tube is spaced apart from the interior surface of the metallic article using one or more non-conductive spacers.

5. The method of claim 1, wherein upon introducing the electrolyte fluid into the metallic cathode tube, the electrolyte fluid is ejected through the plurality of holes towards the interior surface of the metallic article to cause agitation of the electrolyte fluid.

6. The method of claim 1, further comprising disposing the metallic cathode tube and the metallic article into an electrolyte fluid bath during the electrochemical machining.

7. A system for electrochemical machining of a metallic article formed by additive manufacturing, comprising:
    the metallic article, wherein the metallic article comprises an interior surface and a non-linear geometry;
    a flexible, metallic cathode tube inserted into the article, wherein the metallic cathode is spaced apart from the interior surface of the article, wherein the metallic cathode tube comprises a plurality of holes, and wherein the metallic cathode tube is inserted so as to conform to the non-linear geometry of the article;
    an electrolyte fluid introduced into the metallic cathode tube and the interior surface of the article; and
    a cathode terminal at the cathode tube and an anode terminal at the metallic article, wherein the cathode and anode terminals are configured for applying a voltage across the cathode tube and the metallic article, thereby electrochemical machining the metallic article.

8. The system of claim 7, wherein the non-linear geometry comprises one or more bends.

9. The system of claim 8, wherein the metallic article comprises a pipe.

10. The system of claim 7, wherein the metallic cathode tube is spaced apart from the interior surface of the metallic article using one or more non-conductive spacers disposed about the cathode tube.

11. The system of claim 7, wherein upon introducing the electrolyte fluid into the metallic cathode tube, the electrolyte fluid is ejected through the plurality of holes towards the interior surface of the metallic article to cause agitation of the electrolyte fluid.

12. The system of claim 7, further comprising an electrolyte fluid bath, wherein the metallic cathode tube and the metallic article are disposed into the electrolyte fluid bath during the electrochemical machining.

* * * * *